US011939193B2

(12) United States Patent
Hooftman et al.

(10) Patent No.: US 11,939,193 B2
(45) Date of Patent: Mar. 26, 2024

(54) VESSEL AND CRANE FOR OFFSHORE OPERATIONS INVOLVING ENERGY CONSUMING EQUIPMENT OR TOOLS

(71) Applicant: ITREC B.V., Schiedam (NL)

(72) Inventors: Maarten Hugo Hooftman, Schiedam (NL); Terence Willem August Vehmeijer, Schiedam (NL); Cornelis Martinus Van Veluw, Schiedam (NL)

(73) Assignee: ITREC B.V., Schiedam (NL)

( * ) Notice: Subject to any disclaimer, the term of this patent is extended or adjusted under 35 U.S.C. 154(b) by 345 days.

(21) Appl. No.: 17/608,114

(22) PCT Filed: May 1, 2020

(86) PCT No.: PCT/EP2020/062212

§ 371 (c)(1),
(2) Date: Nov. 1, 2021

(87) PCT Pub. No.: WO2020/221929

PCT Pub. Date: Nov. 5, 2020

(65) Prior Publication Data

US 2022/0219951 A1 Jul. 14, 2022

(30) Foreign Application Priority Data

May 2, 2019 (NL) ...................................... 2023056

(51) Int. Cl.
*B66C 13/14* (2006.01)
*B63B 27/10* (2006.01)
(Continued)

(52) U.S. Cl.
CPC .............. *B66C 13/14* (2013.01); *B63B 27/10* (2013.01); *B66C 23/52* (2013.01); *B66C 23/82* (2013.01)

(58) Field of Classification Search
CPC ......... B66C 13/14; B66C 23/52; B66C 23/82; B63B 27/10; B66D 3/04; B66D 3/043
See application file for complete search history.

(56) References Cited

U.S. PATENT DOCUMENTS 3,473,337 A 10/1969 Carter, Jr.
3,779,195 A 12/1973 Oeland, Jr.

FOREIGN PATENT DOCUMENTS

EP 2 932 517 B1 7/2018
WO WO 01/21478 A1 3/2001
(Continued)

OTHER PUBLICATIONS

International Search Report for PCT/EP2020/062212 (PCT/ISA/210) dated Jul. 27, 2020.
(Continued)

*Primary Examiner* — Sang K Kim
*Assistant Examiner* — Nathaniel L Adams
(74) *Attorney, Agent, or Firm* — Birch, Stewart, Kolasch & Birch, LLP

(57) ABSTRACT

Providing energy to an energy consuming piece of equipment and/or tool during offshore operations. Use is made of a crane including a substructure, a boom mounted on the substructure, one or more hoist winches and cables, as well as an object suspension device suspended from the boom by the cables. A piece of equipment or tool is suspended from the object suspension device. An energy storage unit is provided on the object suspension device and has an input connector. The boom may be provided with an output connector of an energy charging unit and in a lower supply position of the object suspension device it is disconnected from the input connector of the energy storage unit. The piece of equipment or tool is then run on energy supplied by the energy storage unit. Moving the object suspension device to a charging position thereof by employing the hoist
(Continued)

Figure 1:
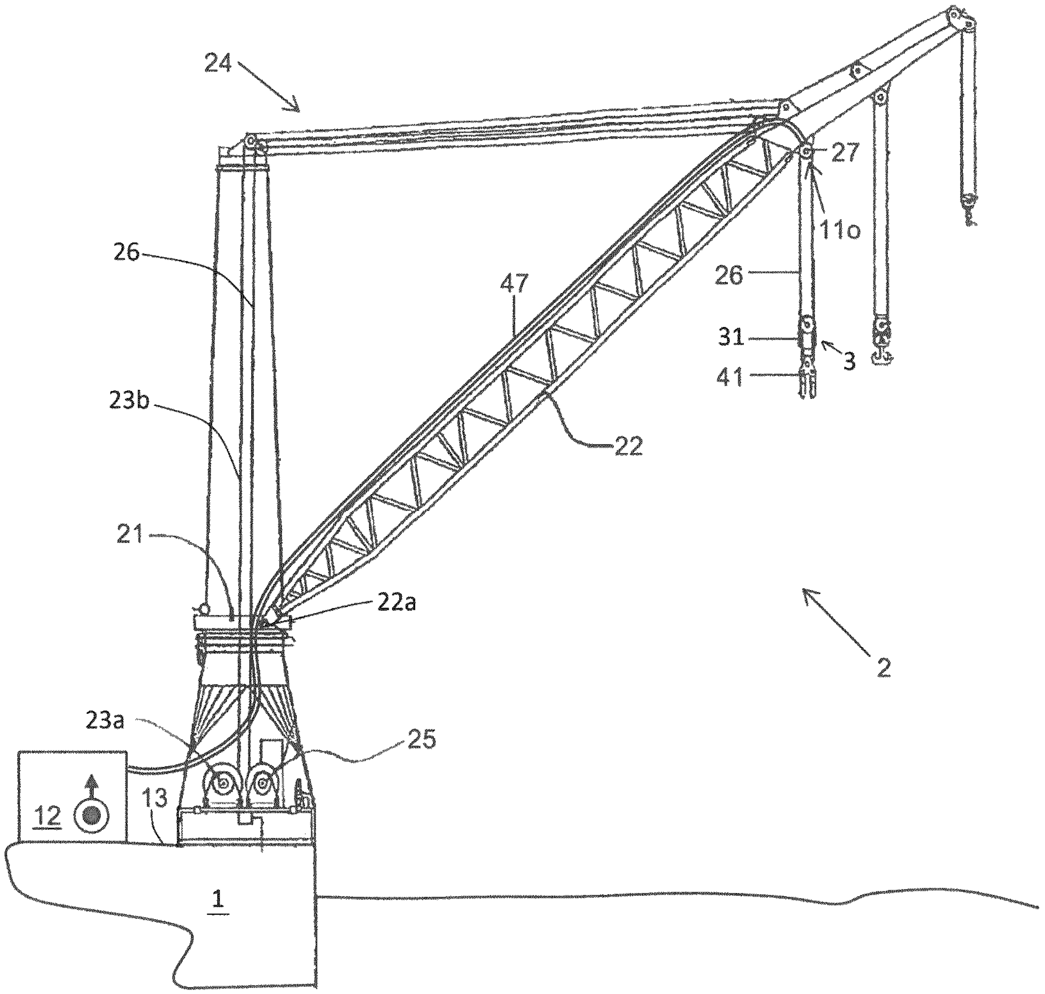

assembly of the crane brings the input connector of the energy storage unit in close proximity of the output connector of the energy charging unit which are then interconnected to charge the energy storage unit from a separate energy source.

15 Claims, 8 Drawing Sheets

(51) Int. Cl.
*B66C 23/52* (2006.01)
*B66C 23/82* (2006.01)

(56) References Cited

FOREIGN PATENT DOCUMENTS

| | | |
|---|---|---|
| WO | WO 2012/114065 A1 | 8/2012 |
| WO | WO 2014/025253 A1 | 2/2014 |
| WO | WO 2018/139931 A1 | 8/2018 |
| WO | WO 2020/055249 A1 | 3/2020 |

OTHER PUBLICATIONS

Written Opinion of the International Searching Authority for PCT/EP2020/062212 (PCT/ISA/237) dated Jul. 27, 2020.

VESSEL AND CRANE FOR OFFSHORE OPERATIONS INVOLVING ENERGY CONSUMING EQUIPMENT OR TOOLS

The invention relates to a vessel and a crane for performing offshore operations involving energy consuming equipment or tools. The invention also relates to methods for performing an operation with the use of such a vessel and crane.

During offshore operations utilizing a crane from which an object is suspended often energy is to be supplied to the object, for instance if the object concerns a piece of equipment or a tool in order to operate the equipment of tool.

The tool to be suspended from the crane may include, for example, a crane hook, a gripping device, e.g. a pile gripping device or a gripper for a transition piece of an offshore wind turbine, a pile lifting and upending device, a lifting tool, for example a monopile upending and lifting tool, a pile driver lifting tool, or a pile driver.

The tools to be suspended from the object suspension device of the crane may be exchangeable, so that multiple tools can be connected to the object suspension device of the crane in an exchangeable manner. In an embodiment, such an exchangeable tool may comprise, or be in a rotationally rigid manner connectable or connected with, a shank provided with a shoulder, which is releasably connectable to a tool clamp configured to engage and release said shank to suspend and release the tool, respectively, e.g. in the manner described in the non-prepublished application WO2020/055249 by the applicant. In another embodiment, for example, the tool may be suspendable by mating male and female connectors as described in WO2018/139931.

According to normal offshore crane practice, energy is supplied to a suspended tool via one or more lines that lead from one or more energy sources on-board the vessel, e.g. on deck of the vessel, e.g. electric, hydraulic, and/or pneumatic energy, to the tool. Commonly, at least two separate lines are used, one for hydraulic or pneumatic energy supplied from, for example, a hydraulic or pneumatic power unit on board of the vessel, and one for electric energy supply from an on-board power unit or on-board power grid. One or more further lines, may, for example, be used for data communication with on-board monitoring and/or control devices associated with the tool.

The present invention aims to provide at least an alternative to the current energy supply to equipment or tools used in offshore operations, while employing a vessel with a crane.

The invention provides a vessel according to claim 1.

The availability of energy on the object suspension device in the form of the rechargeable energy storage unit, which is relatively close to the piece of equipment or tool to be supplied with energy, reduces or eliminates the need to use lines or cables running from an energy source on the vessel, e.g. on the deck, to the piece of equipment or tool suspended underneath the object suspension device as in the prior art approach.

The prior art use of these lines and cables is commonly awkward, amongst others because of the risk of entanglement, snagging, or other contact with the hoisting cables and/or other parts of the crane.

Furthermore, the invention may reduce or eliminate the need for tools and/or equipment that is suspended from the crane to employ an integrated separate energy storage, e.g. an electric battery or a hydraulic power pack integrated with the tool or piece of equipment.

The rechargeable energy storage unit may be configured to store therein electric, pneumatic, or hydraulic energy, up to a predetermined maximum amount in order to be fully charged.

In an embodiment, the energy charging unit which is assigned to the energy storage unit is mounted to the crane, e.g. to the boom of the crane, e.g. to a crown block thereof from which the object suspension device is suspended via the one or more hoisting cables.

In an embodiment, the charging position is an upper charging position and the one or more supply positions are lower supply positions, the object suspension device being movable into the upper charging position and the one or more supply positions by operation of the hoist assembly. For example, the energy storage unit input connector mounted on the object suspension device is movable into proximity of or into connection with the output connector of the charging unit which is mounted to the boom of the crane, e.g. to a crown block thereof. In another embodiment, the charging position is in proximity to or on a deck of the vessel, e.g. the object suspension device being lowerable by operation of the hoist assembly into proximity of or onto the deck for charging of the energy storage unit from the charging unit.

In an embodiment, the boom is luffable and the vessel has a boom rest for the boom, e.g. the boom being in horizontal resting position, wherein the energy charging unit is mounted on the boom rest so as to connect to the energy storage unit on the object suspension device when the boom is on the boom rest. In another embodiment, with the boom resting on the boom rest, the travelling block is lowerable into proximity of or onto the deck for charging of the energy storage unit from the charging unit. For example, the object suspension device is received in a so-called basket when the boom is resting on the boom rest, wherein the charging unit is mounted on the basket so as to charge the energy storage unit. In an embodiment, the charging position is on or adjacent a pedestal of the crane, which pedestal supports the revolving substructure thereon.

In embodiments, the energy stored in the energy storage unit is hydraulic energy, for example in a hydro-pneumatic energy storage unit. For example, the energy storage unit comprises a hydraulic accumulator, e.g. a compressed gas accumulator. Therein the relevant input and output connectors of the energy storage unit, of the energy charging unit, and of or connected to the equipment or tool are embodied as hydraulic connectors. The separate energy source assigned to the energy charging unit in these embodiments may be an on-board hydraulic power unit (HPU).

In embodiments, the energy stored in the energy storage unit is electrical energy, at least one of the pieces of energy consuming equipment and/or tools being powered by electricity. For example, the energy storage unit is a battery, e.g. a battery stack. Therein the relevant input and output connectors of the energy charging unit, of or connected to said pieces of energy consuming equipment and/or tools, and of the energy storage units, are electric connectors. These may include, for example, a wet-mate inductive connector for subsea use, e.g. as described in EP 2 932 517. Preferably, the separate energy source assigned to the storage unit is the on-board electricity grid of the vessel.

Other forms of energy storage are envisaged for the energy storage unit as well. For instance, chemical energy storage, superconducting energy storage, and physical energy storage. Physical energy storage may, for example, include flywheel energy storage.

With regard to chemical energy storage, embodiments are e.g. envisaged in which a fuel cell is employed, e.g. with the fuel cell being provided as part of the object suspension device, and the energy storage unit being formed by a storage cylinder of fuel(s), e.g. ammonia, carbon dioxide, hydrogen, oxygen, and/or, to feed the fuel cell, the fuel cell being configured to supply electricity to the piece(s) of equipment. A larger storage of fuel(s) on or below deck of the vessel may e.g. be employed as remote energy source linked to the energy charging unit for charging the energy storage unit.

Each energy charging unit at least comprises an output connector which is operatively connected to an energy source on board of the vessel, which supplies energy to the energy storage unit(s) assigned thereto, e.g. via one or more lines or cables that run between the energy charging unit and the energy source. An energy charging unit may, for instance, also comprise a transformer, converter, and/or distributor, and/or divider.

Each energy charging unit may comprise a control unit. Such a control unit may be configured to regulate the energy flow to an energy storage unit based on the charging condition thereof, e.g. as sensed by one or more sensors. A control unit may be configured to start and stop the energy flow to in reaction to the energy charging unit being connected and disconnected from the energy storage unit.

The lower supply position of the object suspension device may be above sea level or, in embodiments, below sea level. There may be multiple lower supply positions, e.g. a range of supply positions over a vertical movement path of the object suspension device, e.g. with the upper charging position at the top of said vertical movement path.

In an embodiment, the charging position of the object suspension device is an upper position and the one or more supply positions are lower positions. The object suspension device is movable to the charging position by employing the hoist assembly of the crane, and movable to the supply position by employing the hoist assembly to lower the object suspension device from the upper charging position. Preferably, the upper charging position substantially corresponds to a maximum hoisting height, wherein the object suspension device is directly underneath the boom of the crane, e.g. the travelling block being in closed proximity to the crown block.

The energy charging unit with its one or more output connectors may be mounted to the boom of the crane, e.g. to the crown block.

Each output connector of the charging unit is, advantageously, located at an upper end of a vertical movement path of the input connector of the energy storage unit to which the energy charging unit is assigned, which movement path corresponds to hoisting and lowering the object suspension device by the hoist assembly. Therein this output connector and input connector would ideally be facing each other, being attuned or aligned such that the hoisting of the object suspension device into the charging position facilitates or causes the interconnection of the output connector and input connector in order for the energy storage unit to be charged. In a particular example of this embodiment only said hoisting into the charging position already establishes the interconnection, so that no separate action is required for the interconnection besides the hoisting. The spatial attuning or alignment of these output and input connectors is, in an example, also such that the lowering of the object suspension device by means of the hoist assembly out of the charging position disconnects the output and input connector from each other.

In an example, the energy charging unit with its one or more output connectors is mounted to a crown block of the boom, next to or in between sheaves or sets of sheaves thereof. Herein the crane is provided with a travelling block that is suspended by one or more hoisting cables from the crown block.

In an example, the boom of the crane is pivotally mounted on the substructure and the crane has a luffing assembly for luffing the boom over a range of angular positions. In an embodiment, the output connector of the energy charging unit is mounted pivotally to the boom of the crane, so that this output connector is pivotal, e.g. due to gravity or by a pivoting mechanism, so as to face the input connector of the energy storage unit on the object suspension device in each angular position of the luffable boom.

For example, a crown block of the crane is pivotally mounted to the boom and the one or more output connectors of the one or more energy charging units are mounted on the crown block. Herein the one or more input connectors of the one or more energy storage units are, preferably, mounted on a travelling block of the crane which is suspended by one or more hoisting cables from the crown block. For example, as preferred, herein the one or more output connectors of the one or more energy charging units remain in a vertical orientation independent of the angular position of the luffable boom, and the one or more input connectors of the one or more energy storage units are arranged to be vertical, e.g. in a fixed vertical orientation on the travelling block, so that these connectors are connected and disconnected by vertical relative motion.

In an example, a stopper is provided which engages the object suspension device upon reaching the upper charging position, such that the interconnection with the energy storage is or can be made.

In an embodiment, the energy charging unit is mounted to the crane pivotally, with the output connector thereof within said vertical movement path, as described, in such a way that if so required it can be pivoted out of the vertical motion path of the object suspension device and/or the object suspended thereby, so that the hoisting and lowering thereof is not hindered by the presence of the energy charging unit, while said interconnection is still possible by means of hoisting. For instance, the energy charging unit is mounted to a hoist cable guide, e.g. known from WO2014025253 by the applicant. Other configurations, e.g. telescopic and jacking configurations are also envisaged. In this embodiment the energy charging unit may e.g. be mounted in a middle or lower portion of the crane, which may be advantageous in case of subsea operations —as thereby the charging position is relatively low, so that the distance over which the object suspension device has to be hoisted up to establish said interconnection for charging is reduced with respect to embodiments in which the charging position is mounted to the crane at a higher location.

In embodiments, the separate energy source is provided remote from the energy charging unit, e.g. within the hull of the vessel or on deck of the vessel. The output connector of the energy charging unit is therein operatively connected to the separate energy source thereof via one or more lines and/or cables. In an example the separate energy source is on or below the deck of the vessel and the energy charging unit is mounted to the crown block. Herein the lines and/or cables run along the crane up to the energy charging unit.

The energy storage unit of the object suspension device may consist of one single energy storage unit only, so that one form of energy is stored therein and can be supplied to the piece of equipment and/or tool. In an example, the single energy storage unit is configured to store and supply hydraulic fluid, having a hydraulic input connector and output connector, so that it can serve e.g. a hydraulically operated tool, e.g. a gripper tool, suspended from the object suspension device. The energy charging unit assigned to the single energy storage unit is therein operatively connected or connectable to a HPU (hydraulic power unit) forming the assigned separate energy source. The HPU may be provided on or below deck., with one or more hydraulic lines running between the HPU and the output connector(s) of the charging unit. For example, the gripper tool is configured to grip a pile that is to driven into the seabed, e.g. a monopile as foundation of an offshore wind turbine.

The energy storage unit may also consist of multiple energy storage units, e.g. each storing another form of energy to be supplied to the piece of equipment and/or tool. In an example, two energy storage units are provided, of which one is configured to store and supply hydraulic fluid, an energy charging unit assigned thereto being connected to a HPU as the assigned separate energy source, and the other one is a battery configured to store and supply electric energy, an energy charging unit assigned thereto being connected or connectable to the assigned separate energy source in the form of a generator or other electric source. Both energy storage units may, for instance, each have one input connector for charging, and one or more, e.g. two, output connectors to supply energy to the piece of equipment and/or tool.

In an embodiment, an output connector of a hydraulic energy storage unit is connected to an input connector of a hydraulic device arranged on the object suspension device, e.g. of a tool clamp employing one or more hydraulic cylinders to engage or release a tool to be suspended, or being suspended, from the object suspension device by means of the tool clamp. In an embodiment, another output connector of a hydraulic energy storage unit may be connectable to a hydraulic input connector of a tool.

In an embodiment, an output connectors of the battery type energy storage unit is connected, e.g. via a divider, to e.g. one or more input connectors of one or more sensors of the object suspension device and/or e.g. an electric motor that is employed to establish a rotation of the tool to be or being suspended around a vertical axis with respect to the object suspension device, as enabled by a bearing of the latter when present. In an embodiment, another output connector of the battery may be connected to an electric input connector of a tool, to supply one or more electric components thereof with electricity.

Subsea operations related examples are envisaged as well, e.g. in which a subsea type energy storage unit supplies energy to a piece of subsea equipment or a subsea tool when the object suspension device is in a lower supply position, e.g. a piece of subsea pipeline installation equipment, or a piece of subsea wellbore maintenance equipment.

The energy storage unit is, preferably, mounted on an upper side of the object suspension device, e.g. on top of a travelling block, e.g. between sheave sets of the travelling block. The energy storage unit may also be mounted in a space inside the object suspension device, or be mounted at a lateral or lower side, or a combination. One location may be preferred above the other in view of the position of the assigned energy charging unit and the output connector thereof, the position of the piece(s) of equipment and/or tool(s) to be supplied with the stored energy and the input connector thereof, and the accessibility for personnel on deck and/or e.g. an ROV establishing any interconnections.

In embodiments, the energy storage unit is operatively connectable or connected to the piece of equipment and/or tool suspended underneath the object suspension device via one or more lines and/or cables running through, or along, the object suspension device downwards to an input connector of said piece of equipment and/or tool.

In an embodiment, the vessel comprises one or more exchangeable tools, e.g. a set of multiple exchangeable tools. Therein each exchangeable tool has, or is connectable or connected with, a shank, e.g. a hollow shank, provided with a shoulder. The tool suspension device is configured to releasably engage on the shank in order to suspend the exchangeable tool underneath the tool suspension device, and comprises a tool clamp. This tool clamp comprises a female, open-centered body defining a shank receiving passage with a central vertical axis. The passage allows introduction of the shank of the tool into the passage from below. The tool clamp further comprises one or more mobile tool retainers, adapted to—in a non-operative position thereof—allow introduction of the shank of, or connectable or connected to, the tool from below into the shank receiving passage and—in an operative position thereof—engage below the shoulder of the shank that has been introduced into the passage so as to suspend the shank, and thereby the tool, from the tool clamp.

For example, the travelling block member supports the tool clamp.

In an embodiment, the shank comprises at least one input connector at an upper end region of the shank above the shoulder. This input connector is arranged at the end of a line or cable running through or along the shank, e.g. through the hollow space of a hollow shank, to underneath the object suspension device, when the shoulder is engaged by the tool clamp, such as to operatively be connected or connectable to one or more energy consuming parts of the exchangeable tool.

Preferably, the output connector of the energy storage unit is mounted at an upper side of the object suspension device, such as to be connectable to the input connector of the shank on or via the upper side of the object suspension device. When the shank is engaged by the tool clamp, said input connector thereof is connected or connectable to the output connector of the energy storage unit from above the shank receiving passage. An embodiment is envisaged in which the engagement of the shank by the tool clamp establishes the connection, by attuning the form and positioning of said output and input connectors.

Various features and embodiments of a tool clamp and an associated tool having a shank for use in the context of the present invention are disclosed in the non-prepublished application WO2020/055249 by the applicant, which is for this purpose incorporated herein by reference.

In an embodiment the boom is a rigid boom. In another embodiment, the boom is a variable length boom, e.g. to be composed from boom sections that are adjoined to one another to make up the length of the boom or telescopically extensible.

In an embodiment, the boom is lattice work boom.

The invention is further related to a crane according to claim 10.

In an embodiment of the crane the output connector of the energy charging unit is located at an upper end of a vertical movement path of the input connector of the energy storage unit it is assigned to during hoisting and lowering of the object suspension device by the hoist assembly into and out of the charging position thereof.

In an embodiment, the output connector and input connector are directed towards one other, such that only the hoisting of said object suspension device into the charging position interconnects the output connector and input connector in order to charge the energy storage unit.

In an embodiment of the crane, the separate energy source is provided remote from the energy charging unit, e.g. wherein the separate energy source is supported on a supporting surface of a vessel, e.g. on deck, and the energy charging unit is mounted to the boom.

In an embodiment of the crane, the output connector of the energy storage unit is provided at a lower end of one or more lines and/or cables running downwards through, or along, the object suspension device such that the input connector of the piece of equipment and/or tool, when suspended underneath the object suspension device, is connectable or connected to the output connector.

The invention also relates to an object suspension device having a travelling block member that is configured to be suspended by one or more winch driven cables of a crane, e.g. a crane of a vessel, which object suspension device supports a tool clamp which is configured to releasably engage on a shank that is part of or is connectable to an energy consuming exchangeable tool, in order to suspend the exchangeable tool underneath the object suspension device, which tool clamp comprises:

a female, open-centered body defining a shank receiving passage with a central vertical axis allowing introduction of the shank into the passage from below, and one or more mobile tool retainers adapted to—in a non-operative position thereof—allow introduction of the shank from below into the shank receiving passage and—in an operative position thereof—engage below the shoulder of the shank that has been introduced into the passage so as to suspend the shank, and thereby the tool, from the tool clamp, wherein the object suspension device is provided with a rechargeable energy storage unit that is mounted to the object suspension device, e.g. to the travelling block member thereof, and that is configured to store therein energy, wherein the energy storage unit comprises an input connector and an output connector, which input connector of the energy storage unit is connectable to an output connector of an energy charging unit when the object suspension device is in a charging position, in order to charge the energy storage unit from a separate energy source that is assigned to the energy charging unit, wherein the energy storage unit is configured to supply, when the object suspension device is in a supply position remote from the charging position, e.g. below the charging position, and the input connector of the energy storage unit is disconnected from the output connector of the energy charging unit, energy stored therein to the energy consuming tool via the output connector of the energy storage unit and an interconnected input connector of, or operatively connected to, said tool.

In an embodiment, the shank comprises an input connector located at an upper end region of the shank, above the shoulder, and wherein the output connector of the energy storage unit is provided on the object suspension device such as to be connectable to the input connector of the shank, wherein the input connector of the shank is arranged at an end of a line or cable running down through the shank to underneath the object suspension device when the shank is engaged by the tool clamp, such as to operatively be connected or connectable to an energy consuming part of the exchangeable tool, e.g. wherein the shank is integral with the tool so that the input connector of the shank forms the input connector of the tool, or e.g. wherein the shank is separate from the tool and an operative connection is established via an interconnection of an output connector at a lower end of the shank and the input connector of the tool.

The object suspension device described above may have one or more additional features as described herein.

The invention also relates to the combination of an object suspension device and an exchangeable tool as described herein.

The invention also relates to a method for providing energy to an energy consuming piece of equipment and/or a tool, e.g. during offshore operations, wherein use is made of a vessel, and/or a crane and/or an object suspension device as described herein.

In an embodiment, the method comprising the steps of:

suspending the energy consuming piece of equipment or tool from the object suspension device, connecting an input connector of the suspended piece of equipment or tool to an output connector of the energy storage unit, in a supply position of the object suspension device, wherein an output connector of an energy charging unit is disconnected from an input connector of the energy storage unit, operating the suspended piece of equipment or tool on energy being supplied by the energy storage unit, thereby discharging the energy storage unit, moving the object suspension device to the charging position thereof by employing the hoist assembly of the crane, in which charging position the input connector of the energy storage unit is in close proximity of, e.g. adjoins, the output connector of the energy charging unit assigned thereto, in said charging position, connecting the input connector of the energy storage unit discharged to the output connector of the energy charging unit assigned thereto, supplying the energy storage unit discharged and connected with energy from a separate energy source by means of the energy charging unit assigned and connected thereto, such as to charge the energy storage unit.

In an embodiment, the method comprises the following steps.

First, a piece of equipment or a tool is suspended from the object suspension device. This, for example, takes place on the deck of the vessel. The piece of equipment or tool may be embodied and have characteristics as has been described earlier. For example, the tool may be one of multiple exchangeable tools, e.g. the set of tools being present on-board of the vessel with the crane. These tools, for example, comprise or are connected with a shank provided with a shoulder. The suspension device has a tool clamp that is configured to releasably engage on the shank in order to suspend the exchangeable tool underneath the tool suspension device. A suspension step then comprises the introduction of the shank of the tool into the passage of the clamp from below, and the operation of the tool clamp to move mobile tool retainers from a non-operative position to an operative position in which they engage below the shoulder of the shank that has been introduced.

Then the input connector of said piece of equipment or tool is connected to the output connector of the energy storage unit. After this, the piece of equipment or tool may be supplied with energy by the connected energy storage unit.

In a supply position of the object suspension device, the suspended piece of equipment or tool is then operated on energy being supplied by the energy storage unit. The energy storage unit is thereby discharged. There is no connection to the energy charging unit at this supply position.

After the operation using the piece of equipment or tool has been completed, or the storage unit exhausted, the object suspension device is moved to the upper charging position thereof by employing the hoist assembly of the crane. In the charging position, the input connector of the energy storage unit is, preferably, in close proximity of, e.g. adjoins, e.g. automatically connects to, the output connector of an assigned energy charging unit.

In the charging position, the energy storage unit that has been discharged is connected to the energy charging unit. When the position and orientation of the relevant connectors so allow, this connection may take place by means of said hoisting and does not involve a separate connecting action.

The charging may e.g. be performed until the energy storage unit is fully charged again, or if more efficient, until it has reached a state of charge sufficient for a next operation of the piece of equipment or the tool.

In an embodiment the suspended piece of equipment or tool is removed from the object suspension device prior to said moving of the object suspension device to the charging position, and e.g. placed on deck, so that said charging takes place without the piece of equipment or tool still being suspended therefrom.

Figure 2:
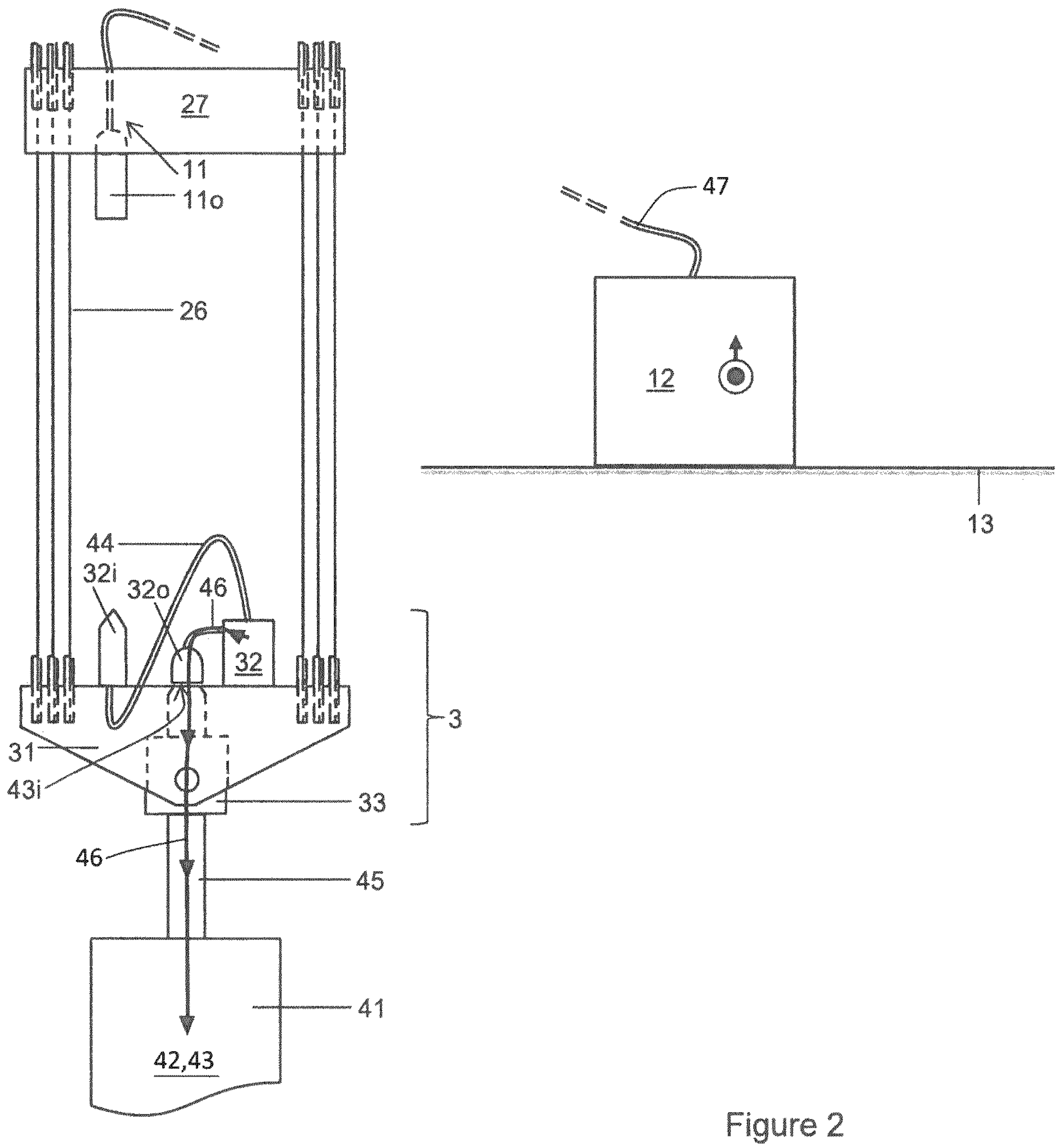
Figure 3:
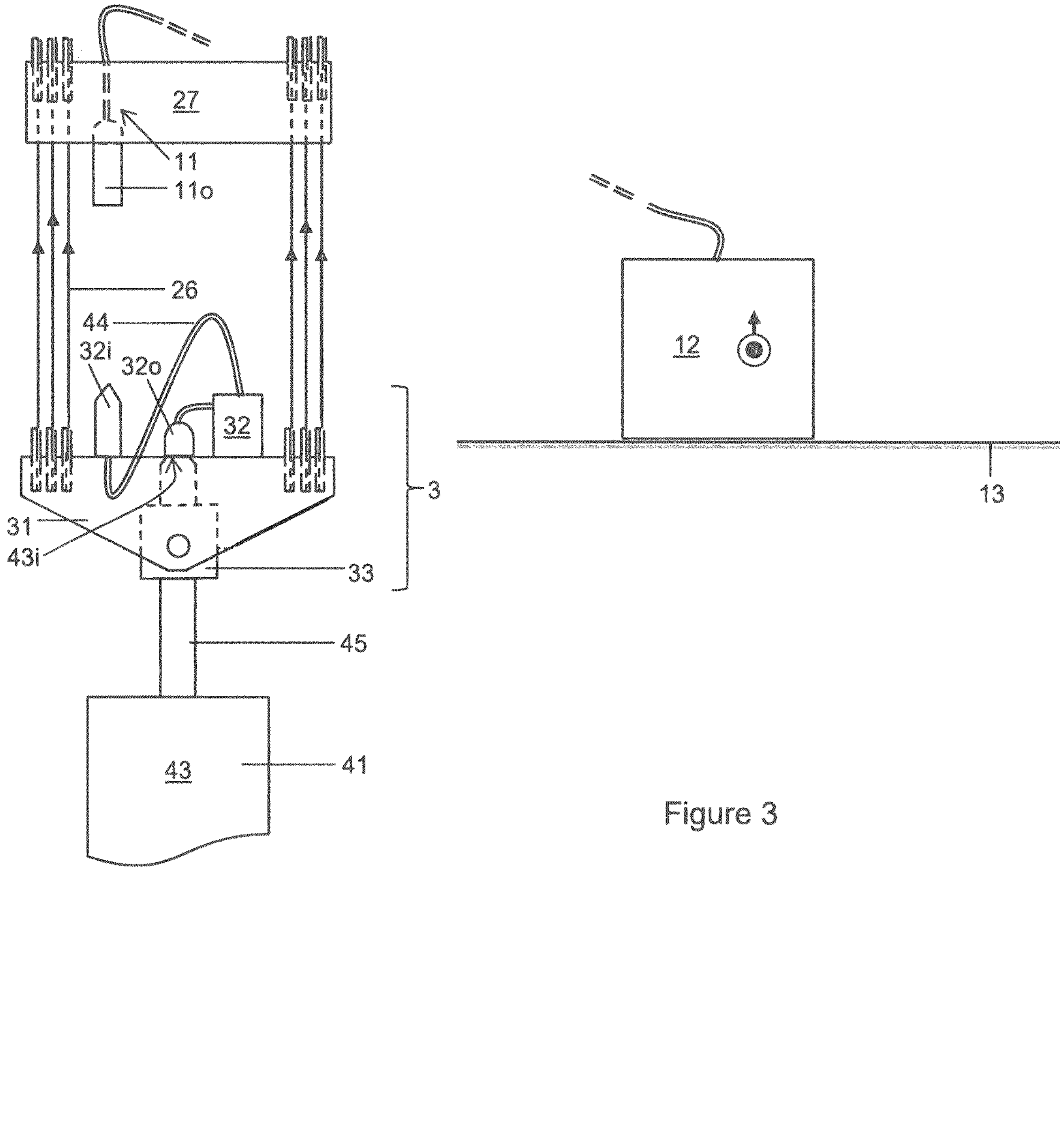
Figure 4:
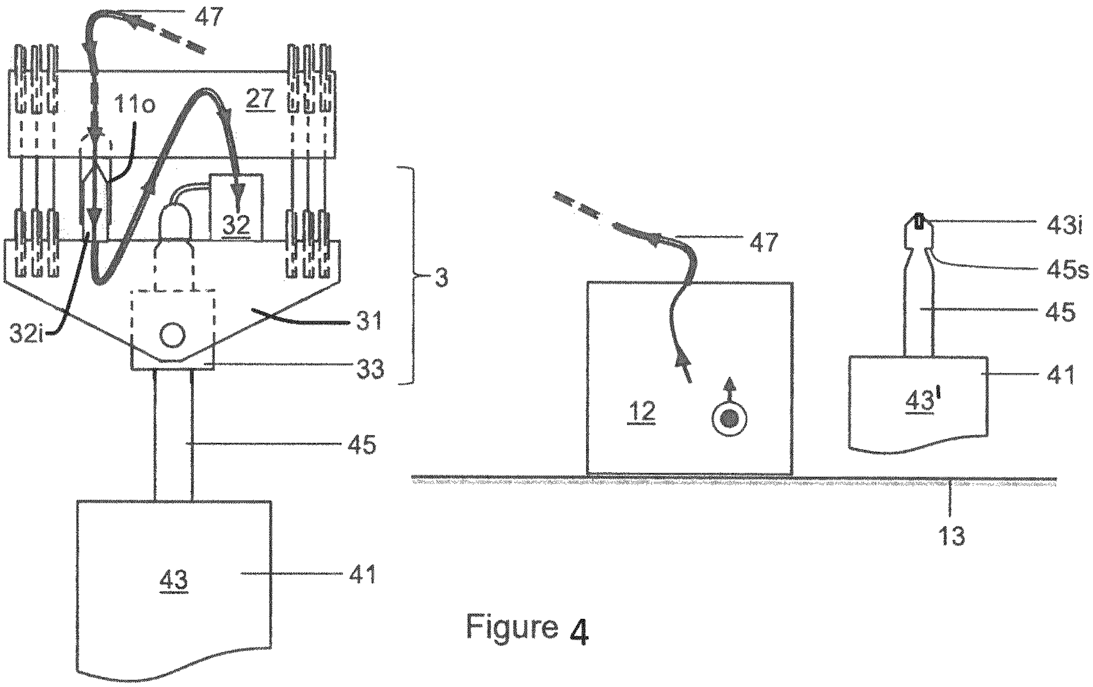
Figure 5:
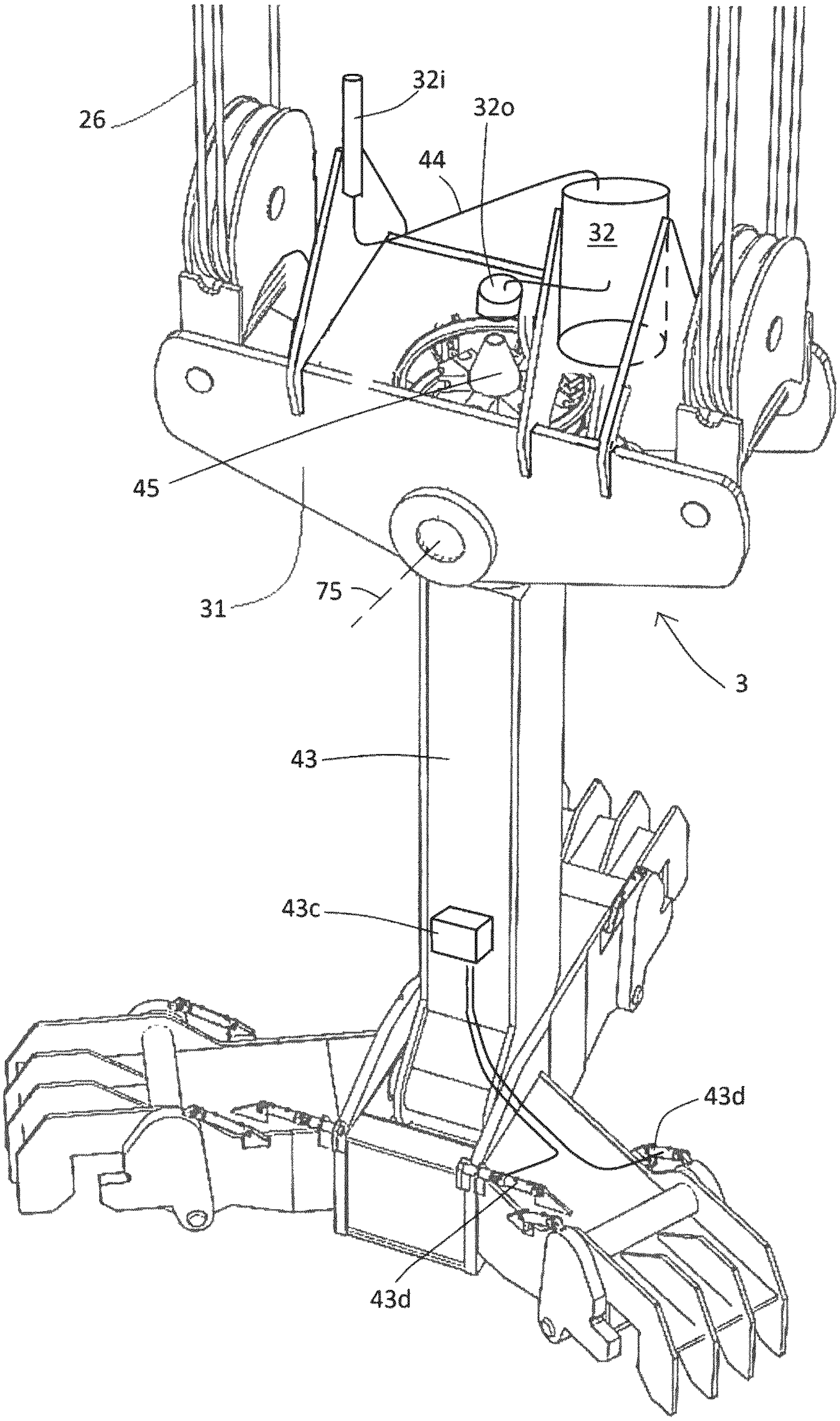
Figure 6:
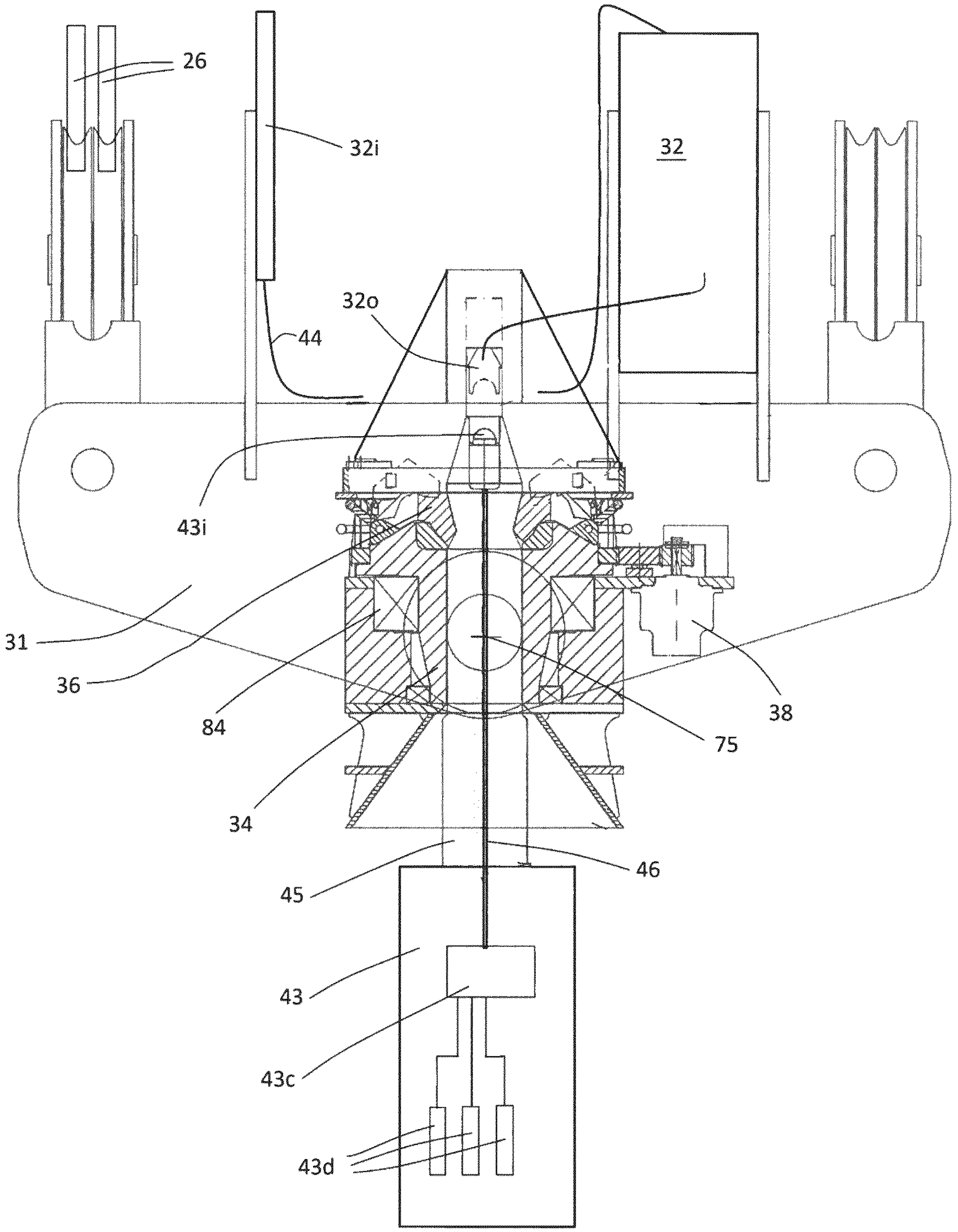
Figure 7:
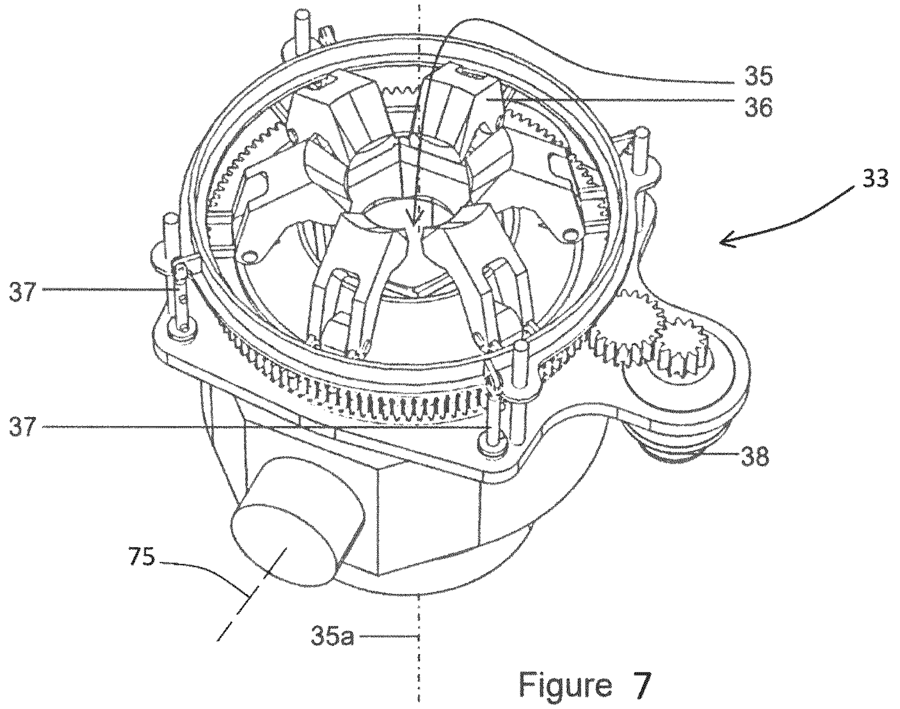
Figure 8:
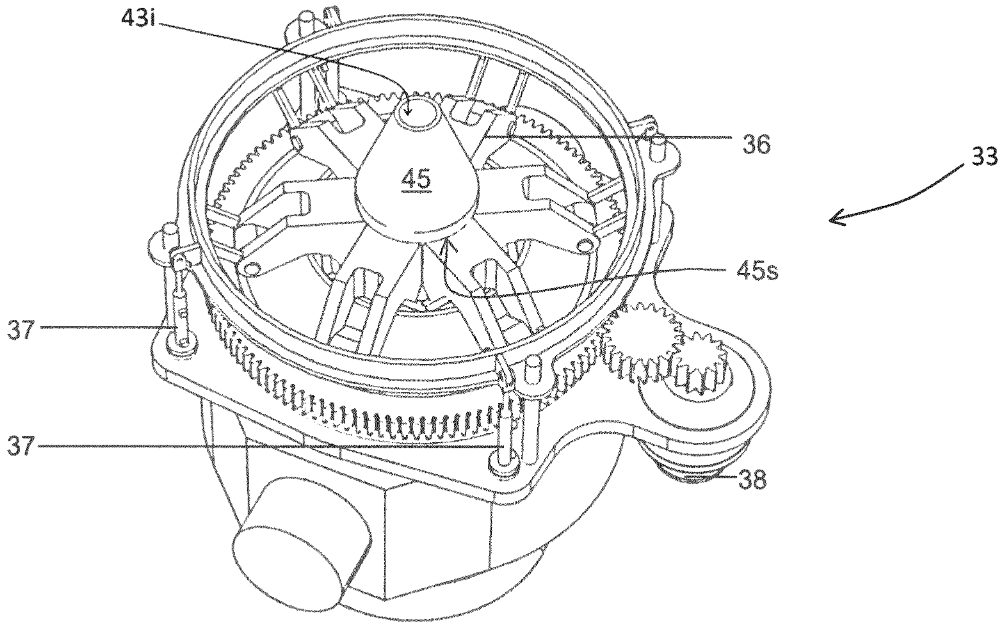
Figure 9:
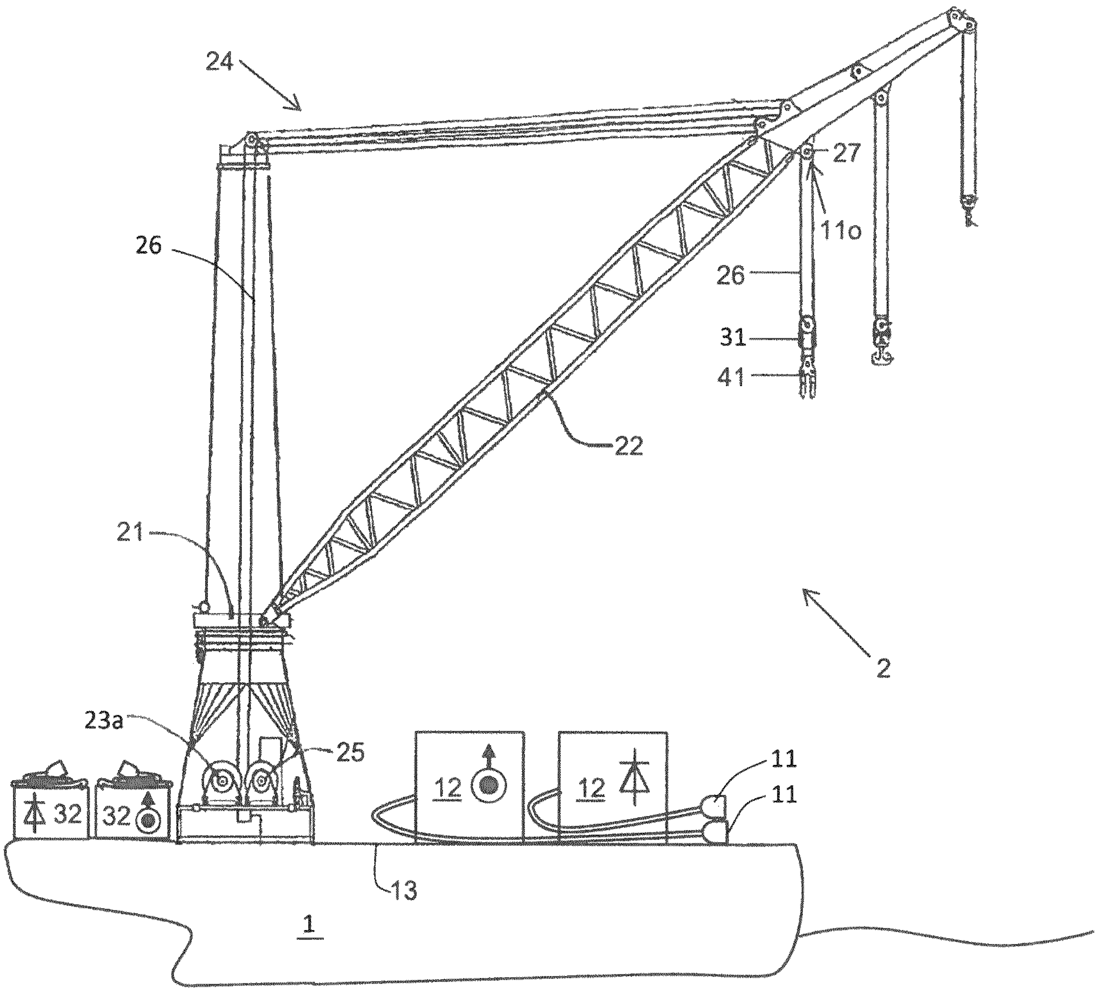

Embodiments of the invention will now be described with reference to the appended figures. In the figures:

FIG. 1 schematically depicts a first embodiment of a vessel according to the invention, FIG. 2 schematically depicts the first embodiment, the object suspension device thereof being in a supply position, FIG. 3 schematically depicts the first embodiment, the object suspension device thereof being hoisted upwards from the supply position, FIG. 4 schematically depicts the first embodiment, the object suspension device thereof being in the charging position, FIG. 5 schematically depicts an embodiment of an object suspension device having a tool clamp and an exchangeable tool according to the invention, FIG. 6 schematically shows a cross-section of the object suspension device with tool clamp and an exchangeable tool of FIG. 5, FIG. 7 schematically depicts the tool clamp of FIGS. 5, 6 without the shank of the exchangeable tool being inserted, with the mobile tool retainers in the non-operative position, FIG. 8 schematically depicts the tool clamp of FIG. 7 with the mobile tool retainers in the operative position retaining the shank, FIG. 9 schematically depicts a second embodiment of a vessel according to the invention.

FIG. 1 depicts a first exemplary embodiment of a vessel 1 comprising a crane 2 for performing offshore operations involving energy consuming equipment and/or tools.

The crane 2 comprising a substructure 21, here a revolving substructure 21, and a boom 22 that is mounted on the substructure 21. The boom 22 is at an inner end thereof pivotally mounted on the substructure about a pivot axis 22*a* allowing for luffing the boom 22 up and down.

A luffing assembly, here with luffing winch 23*a* and luffing cable 23*b*, is provided for luffing of the boom 22.

The crane 2 has a hoist assembly 24 configured for hoisting and lowering an object, which comprises:

one or more hoist winches 25, one or more hoist cables 26 driven by the one or more hoist winches 25, an object suspension device 3 configured to releasably engage an object 41, e.g. a tool 42 or a piece of equipment 43, in order to suspend the object 41 underneath the object suspension device 3.

In this example, the object suspension device 3 comprising a travelling block member 31 which is suspended from a crown block 27 on the boom 22 via the one or more winch driven hoist cables 26 of the hoist assembly 24.

The object suspension device 3 is provided with a rechargeable energy storage unit 32 that is mounted to the object suspension device 3, here to the travelling block member 31 thereof.

This unit 32 is configured to store therein energy.

The energy storage unit 32 comprises an input connector 32*i* and an output connector 32*o*.

As will be explained in more detail below, the object suspension device 3 is movable by employing the hoist assembly 24 into an upper charging position and one or more lower supply positions remote from, here below, the charging position.

The vessel 1 further comprising an energy charging unit 11 which is assigned to the energy storage unit 32. Here the energy charging unit 11 including an output connector 110 thereof is mounted to the boom 22 of the crane, e.g. to the crown block 27 thereof.

For example, the unit 11 is a stationary energy charging unit 11 mounted to the crane 2 at a fixed location thereon, e.g. to the crown block 27 of the boom 22 of the crane 2.

The energy charging unit 11 is configured such that, when the object suspension device 3 is in the charging position, the input connector 32*i* of the energy storage unit 32 is connectable to the output connector 110 of the energy charging unit 11 in order to charge the energy storage unit 32 from a separate energy source 12 that is assigned to the energy charging unit 11.

The energy storage unit 32 is configured to supply, when the object suspension device 3 is in one of the lower supply positions and the input connector 32*i* of the energy storage unit 32 is disconnected from the output connector 110 of the energy charging unit 11, energy stored therein to a piece of energy consuming equipment 42 and/or an energy consuming tool 43 via the output connector 32*o* of the energy storage unit 32 and an interconnected input connector 43*i* of, or operatively connected to, said piece of equipment 42 or tool 43.

As can be seen in FIGS. 2, 3, and 4 the object suspension device 3 is movable into the upper charging position (FIG. 4) and the one or more lower supply positions by operation of the hoist assembly 24.

The output connector 110 of the energy charging unit 11 is located at an upper end of a vertical movement path of the input connector 32*i* of the energy storage unit 32 during hoisting and lowering of the object suspension device 3 by the hoist assembly 24 into and out of the charging position thereof.

The output connector 110 of the energy charging unit 11 and input connector 32*i* of the energy storage unit 32 are directed towards one other, such that the hoisting of said object suspension device 3 into the charging position facilitates or causes the interconnection of said output connector 110 and input connector 32*i* in order to charge the energy storage unit 32.

As preferred, the crown block 27 of the crane is pivotally mounted to the boom 22 and the one or more output connectors 110 of the one or more energy charging units 11 are mounted on the crown block 27. Herein the one or more input connectors 32*i* of the one or more energy storage units are mounted on the travelling block 31 of the crane which is suspended by one or more hoisting cables 26 from the crown block 27. Herein the one or more output connectors 110 of the one or more energy charging units 11 remain in a vertical orientation independent of the angular position of the luffable boom 22. As for example shown in FIG. 5, the one or more input connectors 32*i* of the one or more energy storage units 32 are arranged to be vertical, e.g. in a fixed vertical orientation on the travelling block 31, so that these connectors 110 and 32*i* are connected and disconnected by vertical relative motion, e.g. caused by operation of the hoisting assembly or by another actuator that causes the desired mating and disconnecting of these connectors when the travelling block is in the upper charging position.

For example, in order to avoid damage to the connectors 110 and 32*i*, a stopper can be provided which engages the object suspension device 3, 31 upon reaching the upper charging position, such that the interconnection with the energy storage is or can be made reliably.

It is shown that separate energy source 12 is provided remote from the energy charging unit 11 on the crane 2, which unit 11 here is located on the boom 22. It is shown here that the separate energy source 12 is supported on a supporting surface, here deck 13, of the vessel 1. One or more lines 47, e.g. for hydraulic fluid, and/or cables 47, e.g. for electricity, run from the separate energy source 12 along the crane 2 up to the energy charging unit 11 on the boom 22.

For example, the energy stored in the energy storage unit 32 is electrical energy. Preferably, the separate energy source 12 is an on-board electricity grid of the vessel 1.

For example, the energy stored in the energy storage unit 32 is hydraulic energy.

In an embodiment, the output connector 32*o* of the energy storage unit 32 is provided at a lower end of one or more lines and/or cables 46 running downwards through, or along, the object suspension device 3 such that the input connector 43*i* of the piece of equipment 42 and/or tool 43, when suspended underneath the object suspension device 3, is connectable or connected to the output connector 32*o* of the energy storage unit 32.

The figures illustrate the presence of an exchangeable tool 43. In FIG. 5, by way of example, the tool 43 is a lifting tool for a monopile that is to be installed into the seabed and to serve as foundation of an offshore wind turbine.

The exchangeable tool 43 has a shank 45 that is provided with a shoulder 45*s*. The shank 45 may be integral part of the tool 43, or may be releasable from the tool 43 to be connected therewith when needed.

It is illustrated that the travelling block member 31 supports a tool clamp 33 which is configured to releasably engage on the shank 45 in order to suspend the exchangeable tool 43 underneath the object suspension device 3.

The tool clamp 33 comprises:

- a female, open-centered body 34 defining a shank receiving passage 35 with a central vertical axis 35*a* allowing introduction of the shank 45 into the passage 35 from below, and
- one or more mobile tool retainers 36 adapted to—in a non-operative position thereof (see FIG. 7)—allow introduction of the shank 45 from below into the shank receiving passage 35 and—in an operative position thereof (see FIG. 8)—engage below the shoulder 45*s* of the shank 45 that has been introduced into the passage 35 so as to suspend the shank 45, and thereby the tool 42, from the tool clamp 33.

As preferred, the one or more mobile tool retainers 36 form with the body 34 a swivelling assembly support via a swivel bearing 84 which allows for swivelling of the tool 43 about the axis 35*a*.

For example, as shown, the tool clamp 33 comprises an electric motor 38, which drives a rotation of the female open-centered body 34 of the tool clamp 33, and thereby a rotation of the shank 45, and thus the tool 43, around the vertical axis 35*a* of the shank receiving passage 35.

This motor 38 is supplied with electrical energy from the energy storage unit 32.

Actuators 37, here electric spindle drives 37, of the tool clamp 33 move the mobile tool retainers 36 thereof between the operative and a non-operative position. More details on possible embodiments and the operation of the tool clamp 33 are provided in the non-prepublished application WO2020/055249 by the applicant.

It is illustrated, as preferred, that input connector 43*i* is arranged at the top end of the shank 45, e.g. recessed therein, e.g. above the shoulder 45*s*. The output connector 32*o* of the energy storage unit 32 is arranged on the device 3, here on travelling block member 31, to be mated with the input connector 43*i*. For example, as illustrated, the connector 32*o* is movable on command between a connected and disconnected position.

As preferred, the tool clamp 33 and the output connector 32*o* of the energy storage unit 32 that is arranged to be mated with input connector 43*i* at the top end of the shank 45 when held by the tool clamp 33 are assembled into an assembly that is pivotal about a horizontal pivot axis 75 relative to the travelling block 31. This allows for pivotal motion about axis 75 of the tool 43 and any objected handled by the tool (when present) relative to the travelling block 31.

It is illustrated that the input connector 43*i* of the shank is arranged at an end of a line or cable 46 running down through or along the shank 45, e.g. through a hollow shank 45, to underneath the object suspension device 3 when the shank is engaged by the tool clamp 33, such as to operatively be connected or connectable to an energy consuming part of the exchangeable tool 43.

For example, the shank 45 is integral with the tool 43 so that the input connector 43*i* of the shank 45 forms the input connector 43*i* of the tool 43. In another embodiment, the shank 45 is separate from the tool 43 and an operative connection is established via an interconnection of an output connector at a lower end of the shank and the input connector of the tool.

It is illustrated, by way of example, that the tool 43 has energy consuming parts, here including electric spindle drives 43*d* for providing controlled motion of parts of the tool 43.

It is illustrated, by way of example, that the tool 43 has a controller 43*c* for controlling operation of one or more energy consuming parts 43*d*. For example, the controller 43 configured to communicate wireless to a controller on-board the vessel 1.

For example, the energy charging unit 11 is connected to a remote and separate electric energy source 12, e.g. which is supported on the supporting surface 13 of the vessel 1, and is configured to supply, from the energy source 12, electric energy to the energy storage unit 32 via an output connector 110 of the energy charging unit 11.

When the device 3 is in a lower supply position, the energy storage unit 32 is disconnected from the charging unit 11 and is configured to supply the energy stored therein to the tool 43 suspended from the device 3, which tool 43 is configured to operate on said energy, via a first output connector 32*o* of the energy storage unit 32 and an input connector 43*i* of the tool 43, when the first output connector 32*o* and the input connector 43*i* are interconnected. By such energy supply to the tool 43, the energy storage unit 32 is discharged.

The hoist assembly 24 is configured to lower the object suspension device 3 into a supply position thereof, which is shown in FIG. 2. In this supply position, the first output connector 32*o* of the energy storage unit 32 is connectable, or connected, as shown in FIG. 2, to the input connector 43*i* of the tool 43 to supply the energy stored therein to the tool 43.

The direction of the energy flow of the supply is schematically indicated in FIG. 2 by the thicker line with filled arrows.

The hoist assembly 24 is configured to hoist the object suspension device 3 upwards into a charging position, which is shown in FIG. 5. When in this charging position, the energy storage unit 32 is charged via input connector 32*i* of energy storage unit 32 when it is connected with the output connector 110 of the assigned energy charging unit 11. The input connector 32*i* is connected via line or cable 44 to the unit 32.

When the tool 43 is not needed, e.g. in order to replace the tool 43 for another exchangeable tool 43' having a shank 45, the tool 43 may be lowered onto supporting surface 13 of the vessel 1 and disconnected from the first output connector 32*o* of the energy storage unit 32 as well as released from the object suspension device. A disconnected and released tool 43' may be placed on the supporting surface 13 of the vessel 1, as shown in FIG. 4.

Energy stored in the energy storage unit 32 may be used also for operation of the tool clamp 33, e.g. operating the one or more actuators 37 for controlled engagement and/or release of the tool by the tool clamp 33. For example, the energy is hydraulic energy and the actuators 37 are hydraulic actuators.

In the charging position of FIG. 4, the input connector 32*i* of the energy storage unit 32 is connectable, or connected, as shown, to at least one of the output connectors 110 of the assigned energy charging units 11, in order to charge the energy storage unit 32, for example via hydraulic line 47 that runs along the crane 2—see FIG. 1—to the separate energy source 12.

The direction of the energy flow of the charging is schematically indicated in FIG. 4 by the thicker line with filled arrows.

After charging, the object suspension device 3 may be lowered into a disconnected supply position.

The object suspension device 3 may have its own one or more energy consuming devices, e.g. electrical devices, e.g. including one or more GPS-sensors and/or camera's, actuators related to a tool clamp, etc. These are, preferably, also supplied with energy from the energy storage unit 32.

FIG. 9 relates to a second exemplary embodiment, which has a number of equally-numbered features in common with the first exemplary embodiment. The discussion of these features is for this reason not repeated—while the differing features are discussed below.

As shown in FIG. 9, two energy sources 12 are supported by the supporting surface 13 of the vessel. These concern an electrical energy source (left in the figure) and a hydraulic energy source (right in the figure). Two respectively assigned energy charging units 11 are also stationed on the deck 13, as well as two respective output connectors 110 thereof.

The object suspension device 3 comprises two energy storage units 32, an electrical storage unit 32 in the form of a battery, and a hydraulic energy storage unit in the form of a pressure accumulator, to which the electrical and hydraulic energy charging units 11 are respectively assigned. The energy storage units each comprise an input connector 32*i*.

In FIG. 9 a charging position of the object suspension device 3 is in proximity of or on the deck 13, such, that the output connectors 110 of the energy charging units 11 are connectable to the input connectors 32*i* of the energy storage units. While connecting and/or charging after the connection has been made, the tool 43 may optionally be supported on the deck 13, and/or undergo maintenance or adjustments, and/or be released from the object suspension device 3, and/or again be introduced into the tool clamp 33 and be engaged thereby to be suspended from the object suspension device 3 again, or be replaced by another tool 43 through the subsequent engagement thereof by the tool clamp 33.

As shown, a further, or primary charging unit 11 with output connector 110 can be provided on the boom 22 as discussed herein above. This allows for charging both in an upper charging position of the device 3 as well as a charging position in proximity or on deck 13.

In an embodiment, the vessel 1 is provided with a basket to receive therein the object suspension device 3, e.g. the travelling block member, e.g. provided with tool clamp 33, when the luffable boom 22 is rested, substantially horizontally, on a boom rest, e.g. as explained in WO2009/099319. For example, herein, a charging unit 11 may be combined with the basket and/or the boom rest for connection to the energy storage unit 32 on the device 3.

FIG. 9 also illustrates, by way of example, that on the supporting surface 13 one or more, here two, replacement energy storage units 32 are provided, identical to the two energy storage units 32 mounted to the object suspension device 3 and mountable to the object suspension device 3. In an embodiment, the one or more energy storage units 32 of the object suspension device 3 are releasably mounted to the object suspension device, these may be released and removed therefrom, and consequently be replaced by the replacement energy storage units 32, by mounting these to the object suspension device. The replacement energy units may e.g. have been charged on the supporting surface 13, e.g. the deck, by means of the energy charging units 11 while the originally mounted energy storage units 32 were in a supply position supplying energy to tool 43 and pieces of equipment 42 during an operation, being discharged. The removed energy storage units 32 may consequently be supported by the supporting surface 13, e.g. the deck, and be charged by the assigned energy charging units 11 after connection of their input connectors 32*i* with the output connectors 110.

The invention claimed is:

1. A crane for performing offshore operations involving energy consuming equipment, the crane comprising:

a substructure;

a boom, pivotally mounted on the substructure;

a luffing assembly configured for luffing of the boom;

a hoist assembly configured for hoisting and lowering an object including the energy consuming equipment, the hoist assembly comprising:

one or more hoist winches; and one or more hoist cables driven by the one or more hoist winches; and a travelling block configured to releasably engage the object, in order to suspend the object underneath the travelling block, wherein the travelling block is suspended from a crown block on the boom via the one or more winch driven hoist cables of the hoist assembly, wherein the travelling block is provided with a rechargeable energy storage unit, the rechargeable energy storage unit being configured to store therein energy, wherein the rechargeable energy storage unit comprises an input connector and an output connector, wherein the travelling block is movable by employing the hoist assembly into a charging position and one or more supply positions remote from charging position, wherein when the travelling block is in the charging position, the input connector of the rechargeable energy storage unit is connectable to an output connector of an assigned energy charging unit in order to charge the rechargeable energy storage unit from a separate energy source that is assigned to the energy charging unit, and wherein when the travelling block is in one of the supply positions and the input connector of the rechargeable energy storage unit is disconnected from the output connector of the energy charging unit, the rechargeable energy storage unit is configured to supply energy stored therein to the energy consuming equipment which is configured to operate on said energy via the output connector of the rechargeable energy storage unit and an interconnected input connector of, or operatively connected to, said energy consuming equipment.

2. The crane according to claim 1, wherein the output connector of the energy charging unit is located at an end of a vertical movement path of the input connector of the rechargeable energy storage unit it is assigned to during hoisting and lowering of the travelling block by the hoist assembly into and out of the charging position thereof.

3. The crane according to claim 2, wherein the charging position is an upper charging position and the one or more supply positions are one or more lower supply positions, and wherein the output connector of the energy charging unit is located at an upper end of the vertical movement path.

4. The crane according to claim 3, wherein the output connector of the energy charging unit is mounted to the crown block.

5. The crane according to claim 1, wherein the output connector of the energy charging unit and the input connector of the rechargeable energy storage unit are directed towards one other, such that only the hoisting of said travelling block into the charging position interconnects the output connector of the energy charging unit and input connector of the rechargeable energy storage unit in order to charge the rechargeable energy storage unit.

6. The crane according to claim 1, wherein the energy consuming equipment is an exchangeable tool, wherein the exchangeable tool has, or is connectable to or connected with a shank provided with a shoulder, and wherein the travelling block supports a tool clamp which is configured to releasably engage on said shank in order to suspend the exchangeable tool underneath the travelling block, the tool clamp comprising:

a female, open-centered body defining a shank receiving passage with a central vertical axis allowing introduction of the shank into the passage from below; and one or more mobile tool retainers adapted to, in a non-operative position thereof, allow introduction of the shank from below into the shank receiving passage and, in an operative position thereof, engage below the shoulder of the shank that has been introduced into the passage so as to suspend the shank, and thereby the tool, from the tool clamp.

7. The crane according to claim 6, wherein the shank comprises an input connector located at an upper end region of the shank, above the shoulder, and wherein the output connector of the rechargeable energy storage unit is connectable to the input connector of the shank, and wherein the input connector of the shank is arranged at an end of a line or cable running down through the shank, such as to operatively be connected or connectable to the exchangeable tool.

8. The crane according to claim 7, wherein the shank is integral with the exchangeable tool so that the input connector of the shank forms the input connector of the exchangeable tool.

9. The crane according to claim 7, wherein the shank is separate from the exchangeable tool and an operative connection is established via an interconnection of an output connector at a lower end of the shank and the input connector of the exchangeable tool.

10. A vessel comprising the crane according to claim 1, wherein the vessel further comprises the energy charging unit which is assigned to the rechargeable energy storage unit.

11. The vessel according to claim 10, wherein the separate energy source is provided remote from the energy charging unit.

12. The vessel according to claim 11, wherein the separate energy source is supported on a supporting surface of the vessel, and wherein one or more lines and/or cables run from the separate energy source along the crane up to the energy charging unit.

13. The vessel according to claim 10, wherein the energy stored in the rechargeable energy storage unit is electrical energy, and wherein the separate energy source assigned thereto is an on-board electricity grid of the vessel.

14. The vessel according to claim 10, wherein the energy stored in the rechargeable energy storage unit is hydraulic energy.

15. A method for providing energy to energy consuming equipment, wherein use is made of the crane according to claim 1, the method comprising the steps of:

suspending the object including the energy consuming equipment from the travelling block;

connecting the input connector of the energy consuming equipment to the output connector of the rechargeable energy storage unit;

in a supply position of the travelling block, wherein the output connector of the energy charging unit is disconnected from the input connector of the rechargeable energy storage unit, operating the energy consuming equipment and/or tool on energy being supplied by the rechargeable energy storage unit and thereby discharging the rechargeable energy storage unit;

moving the travelling block to the charging position thereof by employing the hoist assembly of the crane, in which charging position the input connector of the rechargeable energy storage unit is in close proximity of the output connector of the energy charging unit assigned thereto;

in said charging position, connecting the input connector of the rechargeable energy storage unit to the output connector of the energy charging unit assigned thereto; and charging the rechargeable energy storage unit by supplying energy from the separate energy source to the energy charging unit and via the output connector of the energy charging unit to the input connector of the rechargeable energy storage unit.

* * * * *